United States Patent
Scholl et al.

(10) Patent No.: US 10,369,944 B2
(45) Date of Patent: Aug. 6, 2019

(54) DEVICE AND METHOD FOR CONTROLLING AN OUTPUT STAGE FOR AN ACTUATOR IN A VEHICLE

(71) Applicant: KNORR-BREMSE SYSTEME FUER NUTZFAHRZEUGE GMBH, Munich (DE)

(72) Inventors: Frank Scholl, Ingersheim (DE); Thomas Feucht, Wimsheim (DE); Guenter Herrmann, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 15/738,330

(22) PCT Filed: Jun. 27, 2016

(86) PCT No.: PCT/EP2016/064789
§ 371 (c)(1),
(2) Date: Dec. 20, 2017

(87) PCT Pub. No.: WO2016/207417
PCT Pub. Date: Dec. 29, 2016

(65) Prior Publication Data
US 2018/0178738 A1 Jun. 28, 2018

(30) Foreign Application Priority Data
Jun. 25, 2015 (DE) .................. 10 2015 110 230

(51) Int. Cl.
*G06F 7/00* (2006.01)
*B60R 16/023* (2006.01)
(Continued)

(52) U.S. Cl.
CPC .......... *B60R 16/023* (2013.01); *B60T 13/662* (2013.01); *B60T 13/683* (2013.01); *B60T 13/686* (2013.01)

(58) Field of Classification Search
CPC ... B60R 16/023; B60T 13/662; B60T 13/683; B60T 13/686
(Continued)

(56) References Cited

FOREIGN PATENT DOCUMENTS

| CA | 2926114 A1 | 4/2015 |
|---|---|---|
| DE | 102004049082 A1 | 4/2006 |

(Continued)

OTHER PUBLICATIONS

English Translation for DE102011089995A1.*
(Continued)

*Primary Examiner* — Mahmoud S Ismail
(74) *Attorney, Agent, or Firm* — Gerard Messina

(57) ABSTRACT

A device for controlling an actuator/solenoid valve output stage, for a vehicle, including: a terminal to receive an enable signal via an interface to an application unit, the enable signal assuming enable/disable states to enable/disable output stage control; a first suppression terminal to receive a first suppression signal via a monitoring unit interface, the first suppression signal assuming a first authorization/suppression state for authorizing/suppressing output stage control; a second suppression terminal to receive a second suppression signal via a second monitoring unit interface, the second suppression signal assuming a second authorization/suppression state for authorizing/suppressing output stage control; an output terminal as an interface to the output stage; and a linking unit to provide a control signal for controlling the output stage to the output terminal for the
(Continued)

enable signal, and the first/second suppression signal has the first/second authorization state. Also described are a related method and actuator circuit.

14 Claims, 3 Drawing Sheets

(51) Int. Cl.
*B60T 13/66* (2006.01)
*B60T 13/68* (2006.01)

(58) Field of Classification Search
USPC .......................................................... 701/36
See application file for complete search history.

(56) References Cited

FOREIGN PATENT DOCUMENTS

| DE | 102011089995 | | 6/2013 | |
|---|---|---|---|---|
| DE | 102011089995 | A1 * | 6/2013 | ........... B60N 2/0276 |
| EP | 2101228 | A1 | 6/2009 | |
| WO | 2011068565 | A2 | 6/2011 | |

OTHER PUBLICATIONS

International Search Report dated Nov. 28, 2016, of the corresponding international Application PCT/EP2016/064789 filed Jun. 27, 2016.

* cited by examiner

DEVICE AND METHOD FOR CONTROLLING AN OUTPUT STAGE FOR AN ACTUATOR IN A VEHICLE

FIELD OF THE INVENTION

The present invention relates to a device and a method for controlling an output stage for an actuator in a vehicle, in particular a solenoid valve, and to an actuator circuit for a vehicle.

BACKGROUND INFORMATION

In the event of a malfunction of a controller of a vehicle, the actuators that can be activated by the controller, generally solenoid valves, have to be put into a safe state by monitoring units.

SUMMARY OF THE INVENTION

An object of the present invention is to provide an improved device and an improved method for controlling an output stage for an actuator for a vehicle, and an improved actuator circuit.

This object may be achieved by a device and a method for controlling an output stage for an actuator for a vehicle and an actuator circuit as claimed in the main claims.

The approach according to the invention makes it possible for a plurality of monitoring units and the signal of an application unit, for example of an application computer, to be logically linked, for example using an AND function, in order to enable or to suppress a control of an output stage for an actuator. In accordance with one embodiment, the linkage used in this case can be realized such that even in the event of the failure of an element in the linkage, the monitoring unit can still intervene effectively in order for example to suppress the control of the output stage. In accordance with one embodiment, the linkage can be configured such that any failure leads to a safe state in which for example the control of the output stage is suppressed.

The approach according to the invention can be used in association with a safety circuit for one or a plurality of output stages.

In one simple embodiment, a corresponding device for controlling an output stage for an actuator, in particular a solenoid valve, for a vehicle has the following features:

an enable terminal for receiving an enable signal via an interface to an application unit, wherein the enable signal can assume an enable state for enabling a control of the output stage and a disable state for disabling the control of the output stage;

a suppression terminal for receiving a suppression signal via an interface to a monitoring unit, wherein the suppression signal can assume an authorization state for authorizing the control of the output stage and a suppression state for suppressing the control of the output stage;

an output terminal as an interface to the output stage; and a linking unit configured to provide a control signal for controlling the output stage to the output terminal if the enable signal has the enable state, and the suppression signal has the authorization state.

In accordance with various embodiments, the number of terminals can be extended in any desired way, for example in order to be able to process additional enable signals. Furthermore, the device can be used for controlling any desired number of output stages and/or actuators. Consequently, a plurality of enable terminals can be provided which can act on a plurality of actuators, in particular also on as many actuators as desired.

In accordance with an extended embodiment, a corresponding device for controlling an output stage for an actuator has the following features:

an enable terminal for receiving an enable signal via an interface to an application unit, wherein the enable signal can assume an enable state for enabling a control of the output stage and a disable state for disabling the control of the output stage;

a first suppression terminal for receiving a first suppression signal via an interface to a monitoring unit, wherein the first suppression signal can assume a first authorization state for authorizing the control of the output stage and a first suppression state for suppressing the control of the output stage;

a second suppression terminal for receiving a second suppression signal via an interface to a second monitoring unit, wherein the second suppression signal can assume a second authorization state for authorizing the control of the actuator and a suppression state for suppressing the control of the actuator;

an output terminal as an interface to the output stage; and a linking unit configured to provide a control signal for controlling the output stage to the output terminal if the enable signal has the enable state, the first suppression signal has the first authorization state and the second suppression signal has the second authorization state.

The actuator can be part of a pneumatic, hydraulic or electrical system, for example of a brake system, of the vehicle. An actuator can be understood to mean a solenoid valve or a pressure control valve or generally a load. The actuator is switched on with the aid of the output stage. The signals mentioned can be understood to mean electrical signals. Consequently, the terminals can be electrical contacts.

The device can comprise, optionally, further suppression terminals for receiving further suppression signals via an interface to further monitoring units, wherein the further suppression signals can assume further authorization states for authorizing the control of the output stage and further suppression states for suppressing the control of the output stage.

The output stage can be configured to be actuated in response to reception of the control signal, for example to be put from one state into another state. In this case, one of the states of the output stage can represent a quiescent state and the other of the states an active state, or both states can represent quiescent states and/or active states. In accordance with one embodiment, the output stage can be activated by the control. In this case, the control signal can constitute a signal suitable for activating the output stage.

In accordance with one embodiment, the linking unit is embodied such that the provision of the control signal is prevented in the event of a fault occurring within the linking unit. An undesired control of the output stage can be effectively prevented in this way.

Advantageously, using the device mentioned it can be ensured that the control signal is provided only if both the enable signal and all the suppression signals have defined predetermined states.

The linking unit can accordingly be configured not to provide the control signal if the enable signal has the disable state. Furthermore, the linking unit can be configured not to provide the control signal if the first suppression signal has the first suppression state. Furthermore, the linking unit can be configured not to provide the control signal if, optionally, the second and/or further suppression signals have the second and/or, optionally, further suppression states. Advantageously, the provision of the control signal and thus the control of the output stage can be prevented by any arbitrary one of the signals in this way.

By way of example, the enable state of the enable signal can represent a first logic state, the disable state of the enable signal can represent a second logic state, the authorization states of the suppression signals can represent the second logic state and the suppression states of the suppression signals can represent the first logic state. The first logic state can be defined by "logic one" and the second logic state can be defined by "logic zero". In this way, the linking unit can be realized in a simple manner using digital circuit elements. The different logic states of authorization signals prevent undesired authorization states as a result of control signals that are erroneously of identical type (both log.0 or both log.1). Such erroneous signals of identical type are more probable than non-identical signals.

In accordance with one embodiment, the linking unit can comprise a first switch, and optionally a second switch and/or further switches and a last switch. In this case, the first switch and optionally the second switch and/or the further switches can be connected in series between the enable terminal and a control terminal of the last switch. The last switch can be connected between a supply voltage terminal for providing a supply voltage for operating the output stage and the output terminal. A control terminal of the first switch can be connected to the first suppression terminal. A control terminal of optionally further switches can be connected to the respective further suppression terminals. The switches can be realized by electrical components, for example by transistors. By applying a suitable signal to the control terminal of a switch, said switch can be switched. In accordance with this embodiment, the provision of the control signal can correspond to applying the supply voltage at the output stage. The supply voltage terminal can be a ground terminal or a terminal that provides a voltage potential deviating from a ground potential. Using the elements mentioned for the linking unit, it can be ensured that the provision of the control signal is prevented if one of the elements is faulty.

By way of example, the first switch and optionally the second switch and/or further switches can be embodied as bipolar transistors and the last switch can be embodied as a field effect transistor or as a bipolar transistor. Consequently, the linking unit can be constructed using standard transistors.

The linking unit can comprise a resistor connected between the control terminal of the last switch and the supply voltage terminal. Via the resistor, the control terminal of the last switch can be pulled to an electrical potential that prevents the provision of the control signal if the control terminal of the last switch is disconnected from the enable terminal by opening of the first switch or optionally second switch and/or further switches.

In accordance with one embodiment, the linking unit can comprise a first diode and a second diode. In this case, a safety circuit terminal of the device can be connected to the first and/or second suppression terminal via the first diode, and the third terminal can be connected to the control terminal of the second switch via the second diode. In this way, the linking unit can process a further signal, for example a signal via which the provision of the control signal can be prevented.

Consequently, the device can comprise a safety circuit terminal for receiving a signal. The signal can assume a blocking state for blocking the control of the output stage. In this case, the linking unit can be configured not to provide the control signal if the signal has the blocking state. Consequently, the provision of the control signal can be prevented by a further signal. In accordance with one embodiment, the safety circuit terminal leads to a corresponding safety circuit for the provision of the supply voltage of the output stage or of the output stages for the positive terminal of the actuators.

In accordance with one embodiment, the device can comprise at least one further enable terminal for receiving a further enable signal via a further interface to the application unit or to a further application unit, wherein the further enable signal can assume an enable state for enabling a control of a further output stage and a disable state for disabling the control of the further output stage. Furthermore, the device can comprise a further output terminal as an interface to the further output stage, and the linking unit can be configured to provide a further control signal for controlling the further output stage to the further output terminal if the further enable signal has the enable state, the first suppression signal has the first authorization state and the second suppression signal has the second authorization state. In this way it is advantageously possible to provide a plurality of control signals for controlling different output stages or different sections of an output stage.

To that end, the linking unit can comprise a further first switch, a further second switch and a further third switch. The further first switch and the further second switch can be connected in series between the further enable terminal and a control terminal of the further third switch. The further third switch can be connected between the supply voltage terminal for providing a supply voltage for operating the further output stage and the further output terminal. A control terminal of the further first switch can be connected to the first suppression terminal and a control terminal of the further second switch can be connected to the second suppression terminal. In this way, it is possible to supplement the device per additional enable terminal with an additional circuit branch which, per suppression terminal, can comprise in each case a transistor and an additional output-side transistor.

Correspondingly, the device can comprise at least one further suppression terminal for receiving a further suppression signal via an interface to a further monitoring unit. The further suppression signal can assume a further authorization state for authorizing the control of the output stage and a further suppression state for suppressing the control of the output stage. The linking unit can be configured to provide the control signal for controlling the output stage to the output terminal if the further suppression signal furthermore has the further authorization state.

A method for controlling an output stage for an actuator, in particular a solenoid valve, for a vehicle, comprises the following steps:

receiving an enable signal via an interface to an application unit, wherein the enable signal can assume an enable state for enabling a control of the output stage and a disable state for disabling the control of the output stage;

receiving a first suppression signal via an interface to a monitoring unit, wherein the first suppression signal can assume a first authorization state for authorizing the control of the output stage and a first suppression state for suppressing the control of the output stage;

receiving a second suppression signal via an interface to a voltage monitoring unit, wherein the second suppression signal can assume a second authorization state for authorizing the control of the output stage and a second suppression state for suppressing the control of the output stage; and providing a control signal for controlling the output stage at an output terminal serving as an interface to the output stage if the enable signal has the enable state, the first suppression signal has the first authorization state and the second suppression signal has the second authorization state.

The steps of the method can be implemented for example using units of the abovementioned device for controlling an output stage.

A corresponding actuator circuit for a vehicle has the following features:

an abovementioned device for controlling an output stage for an actuator;

an application unit for providing the enable signal to the enable terminal of the device;

a monitoring unit for providing the first suppression signal to the first suppression terminal of the device;

optionally further monitoring units, for example a voltage monitoring unit, for providing optionally a second and/or further suppression signals to optionally the second suppression terminal and/or the further suppression terminals of the device; and the output stage, wherein a terminal of the output stage is connected to the output terminal of the device.

Exemplary embodiments of the present invention are explained in greater detail below with reference to the accompanying drawings.

In the following description of the exemplary embodiments of the present invention, identical or similar reference signs are used for the similarly acting elements illustrated in the various drawings, a repeated description of these elements being omitted.

DETAILED DESCRIPTION

Figure 1:
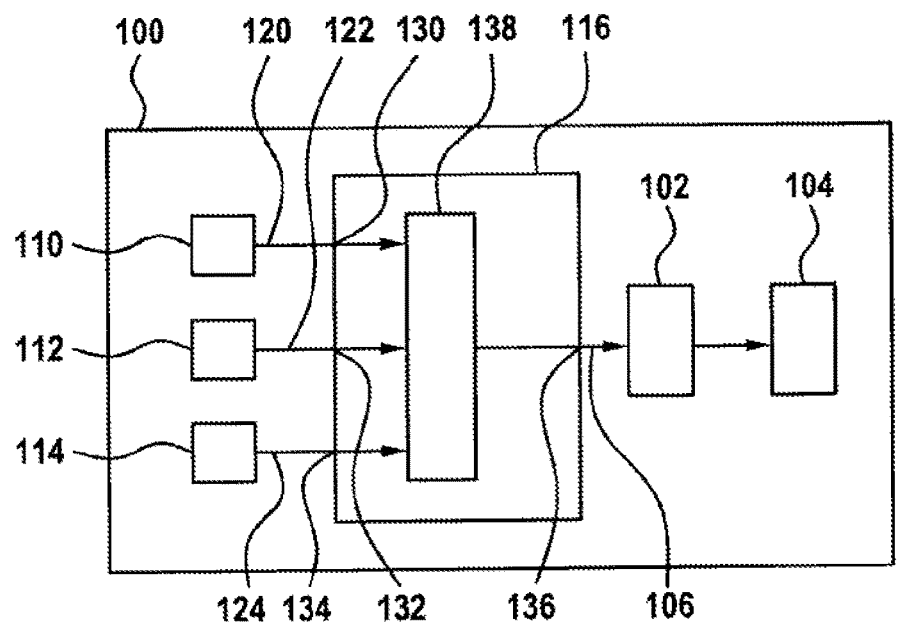
FIG. 1 shows an illustration of an actuator circuit for a vehicle in accordance with one exemplary embodiment of the present invention.

FIG. 1 shows an illustration of a vehicle 100 comprising an actuator circuit in accordance with one exemplary embodiment of the present invention. The vehicle 100, merely by way of example, is a truck or automobile.

The vehicle 100 comprises an output stage 102 that is used to control an actuator 104. The actuator 104 can be used for example to actuate a safety-relevant unit of the vehicle 100, for example a brake. In accordance with this exemplary embodiment, the actuator 104 is realized as a valve which, in one state, allows passage of a fluid, for example of air for a pneumatic control or a hydraulic fluid for a hydraulic control, and, in another state, prevents passage of the fluid. For switching between the states, a control signal 106 is applied to the output stage 102. In accordance with this exemplary embodiment, the control signal 106 constitutes an electric current that causes the output stage 102 to be switched into a first of the states and causes the output stage to be held in the first state. Alternatively, the control signal 106 can constitute an electrical voltage. If the control signal 106 is not provided to the output stage, then the output stage 102 changes, if appropriate, from the first state into the second of the states and remains in the second state until the control signal is provided again.

Besides the output stage 102, the actuator circuit comprises an application unit 110, a monitoring unit 112, a voltage monitoring unit 114 and also a device 116 for controlling the output stage 102. Hereinafter, the application unit 110 is also referred to as an application computer, the monitoring unit 112 is also referred to as a monitoring computer, and the voltage monitoring unit 114 is also referred to as a voltage monitoring circuit.

The application unit 110 is configured to implement an application comprising an actuation of the output stage 102. The application can comprise for example a control of a brake system of the vehicle 100. The application unit 110 can be regarded as a controller or be comprised by a controller. The application unit 110 is configured to provide an enable signal 120 for enabling a control of the output stage 102. Depending on whether the implementation of the application in the application unit 110 reveals that a control of the output stage 102 is intended to be carried out or is not intended to be carried out, the application unit 110 is configured to set the enable signal 120 to an enable state for enabling the control of the output stage 102 or to a disable state for disabling the control of the output stage 102. In this case, the enable state and the disable state can differ by virtue of different voltage levels. The application unit 110 is configured to output the enable signal 120 to the device 116 via an interface.

The monitoring unit 112 is configured to implement a monitoring function, for example for monitoring a correct function of the application unit 110 or an element that is relevant with regard to a correct function of the actuator circuit or of the vehicle 100. The monitoring unit 112 can be regarded as a further controller or be comprised by a controller. The monitoring unit 112 is configured to provide a first suppression signal 122 for suppressing the control of the output stage 102. Depending on whether the implementation of the monitoring function in the monitoring unit 112 reveals that the control of the output stage 102 can be carried out or is intended to be suppressed, the monitoring unit 112 is configured to set the first suppression signal 122 to a first authorization state for authorizing the control of the output stage 102 or to a first suppression state for suppressing the control of the output stage 102. In this case, the authorization state and the suppression state can differ by virtue of different voltage levels. The monitoring unit 112 is configured to output the first suppression signal 122 to the device 116 via an interface.

The voltage monitoring unit 114 is configured to implement a monitoring function for monitoring an electrical voltage, for example an operating voltage used in the actuator circuit. The voltage monitoring unit 114 can be regarded as an electrical circuit. The voltage monitoring unit 114 is configured to provide a second suppression signal 124 for suppressing the control of the output stage 102. Depending on whether the implementation of the monitoring function in the voltage monitoring unit 114 reveals that the control of the output stage 102 can be carried out or is intended to be suppressed, the voltage monitoring unit 114 is configured to set the second suppression signal 124 to a second authorization state for authorizing the control of the output stage 102 or to a second suppression state for suppressing the control of the output stage 102. In this case, the authorization state and the suppression state can differ by virtue of different voltage levels and, in accordance with one exemplary embodiment, can correspond to the states of the first suppression signal. The voltage monitoring unit 114 is configured to output the second suppression signal 124 to the device 116 via an interface.

The device 116 comprises an enable terminal 130, a first suppression terminal 132, a second suppression terminal 134, an output terminal 136 and a linking unit 138. The device 116 is connected to the application unit 110 via the enable terminal 130 and an electrical line and is configured to receive the enable signal 120 from the application unit 110. The device 116 is connected to the monitoring unit 112 via the first suppression terminal 132 and an electrical line and is configured to receive the first suppression signal 122 from the monitoring unit 112. The device 116 is connected to the voltage monitoring unit 114 via the second suppression terminal 134 and an electrical line and is configured to receive the second suppression signal 124 from the voltage monitoring unit 114. The device 116 is connected to the output stage 102 via the output terminal 136 and an electrical line and is configured to provide or not to provide the control signal 106 to the output stage 102 depending on a linkage carried out in the linking unit 138.

The linking unit 138 is configured to link the enable signal 120 and the suppression signals 122, 124 with one another using a linking specification and to provide the control signal 106 depending on a result of the linking. The linking specification can be mapped by an electrical circuit, as is shown in FIG. 2, for example.

The linking unit 138 is configured to provide the control signal 106 if the enable signal 120 has the enable state, the first suppression signal 122 has the first authorization state and the second suppression signal 124 has the second authorization state.

In accordance with one exemplary embodiment, the linking unit 138 is configured not to provide the control signal 106 if the enable signal 120 does not have the enable state and, additionally or alternatively, the first suppression signal 122 does not have the first authorization state and, additionally or alternatively, the second suppression signal 124 does not have the second authorization state.

Figure 2:
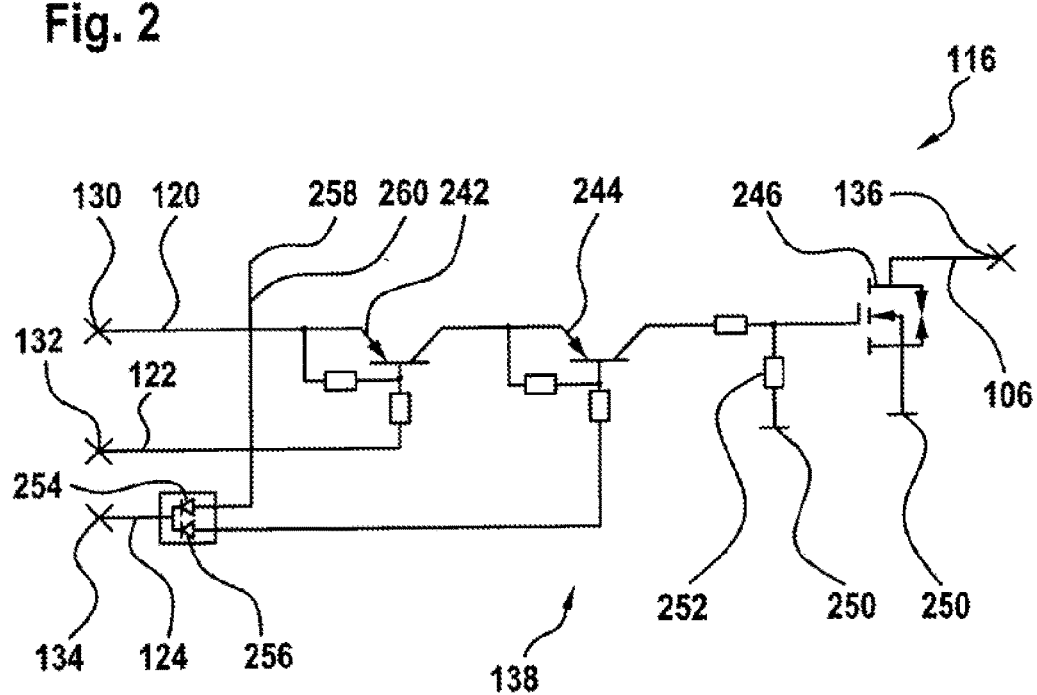
FIG. 2 shows a circuit diagram of a device for controlling an output stage for an actuator in accordance with one exemplary embodiment of the present invention.

FIG. 2 shows a circuit diagram of a device 116 for controlling an output stage for an actuator in accordance with one exemplary embodiment of the present invention. The device 116 can be used in association with the actuator circuit described in FIG. 1.

The device 116 comprises an enable terminal 130 for receiving an enable signal 120, which hereinafter is also referred to as signal ACT_MV12_LS. The enable signal 120 can assume a state log.1, which can be referred to as logic one, as an enable state and a state log.0, which can be referred to as logic zero, as a disable state.

The device 116 comprises a first suppression terminal 132 for receiving a first suppression signal 122, which hereinafter is also referred to as signal ACT_EN_MV12_LS_B. The first suppression signal 122 can assume a state log.0 as an authorization state and a state log.1 as a suppression state.

The device 116 comprises a second suppression terminal 134 for receiving a second suppression signal 124, which hereinafter is also referred to as signal VCC_0V. The second suppression signal 124 can assume a state log.0 as an authorization state and a state log.1 as a suppression state.

The device 116 comprises an output terminal 136 as an interface to the output stage. Via the output terminal 136 the device 116 is configured to output a control signal 106 for controlling the output stage. The control signal 106 hereinafter is also referred to as MV12_LS.

The linking unit 138 is realized as a transistor circuit. Switches for connecting or interrupting lines between the input terminals 130, 132, 134 and the output terminal 136 are thus realized by transistors 242, 244, 246.

The linking unit 138 comprises a first transistor 242, a second transistor 244 and a third transistor 246. The enable terminal 130 is connected to an enable terminal (emitter) of the first transistor 142. A second terminal (collector) of the first transistor 242 is connected to a first terminal (emitter) of the second transistor 244. A second terminal (collector) of the second transistor 244 is connected to a control terminal (gate) of the third transistor 246. A first terminal (source) of the third transistor 246 is connected to a supply voltage terminal, here a ground terminal 250 of the linking unit 138. A second terminal (drain) of the third transistor 246 is connected to the output terminal 136. A control terminal (base) of the first transistor 242 is connected to the first suppression terminal 132. A control terminal (base) of the second transistor 244 is connected to the second suppression terminal 134.

In accordance with an alternative exemplary embodiment, the output stage comprises the third transistor 246. By way of example, the third transistor 246 can constitute a high-side switch.

In accordance with the exemplary embodiment shown in FIG. 2, the transistors 242, 244 are embodied by way of example as bipolar transistors, and the transistor 246 as a field effect transistor. It is also possible to use other suitable transistors with corresponding transistor interconnections.

In accordance with one exemplary embodiment, the control terminal of the third transistor 246 is connected to the ground terminal 250 via a pull-down resistor 252, for example a 10 kohm resistor. The second terminal of the second transistor 244 is connected to the control terminal of the third transistor 246 via a resistor, for example a 100 ohm resistor.

In accordance with one exemplary embodiment, the control terminal of the second transistor 244 is connected to the first terminal of the second transistor 244 via a resistor and to the second suppression terminal 134 via a resistor.

In accordance with one exemplary embodiment, the control terminal of the first transistor 242 is connected to the first terminal of the first transistor 242 via a resistor and to the first suppression terminal 132 via a resistor. A diode can optionally be connected between the first suppression terminal 132 and the control terminal of the first transistor 242.

In accordance with one exemplary embodiment, the device 116 comprises an optional safety circuit terminal 258. In this case, the linking unit 138 comprises a first diode 254 and a second diode 256. The safety circuit terminal 258 of the device 116 is connected to the second suppression terminal 134 of the device 116 via the first diode 254 and the second suppression terminal 134 of the device 116 is connected to the control terminal of the second transistor 244 via the second diode 256. To that end, the second suppression terminal 134 is connected to the cathode terminals of the diodes 254, 256. Via the safety circuit terminal 258, it is possible to provide a signal 260 via which the provision of the control signal 106 can be prevented. A prevention state of the signal 260 can be identified by log.1. In accordance with this exemplary embodiment, the signal 260 leads to a circuit that switches on the output stage to the positive terminal of the actuator.

The circuit shown in FIG. 2 has been chosen merely by way of example. In particular, the number of terminals and thus the series connection of the transistors 242, 244 can be extended arbitrarily in order to be able to process additional enable signals. By way of example, a series connection comprising three, four or more transistors can be used instead of the two transistors 242, 244 shown. This makes it possible to process further signals in addition to the signals 122, 124.

Figure 4:
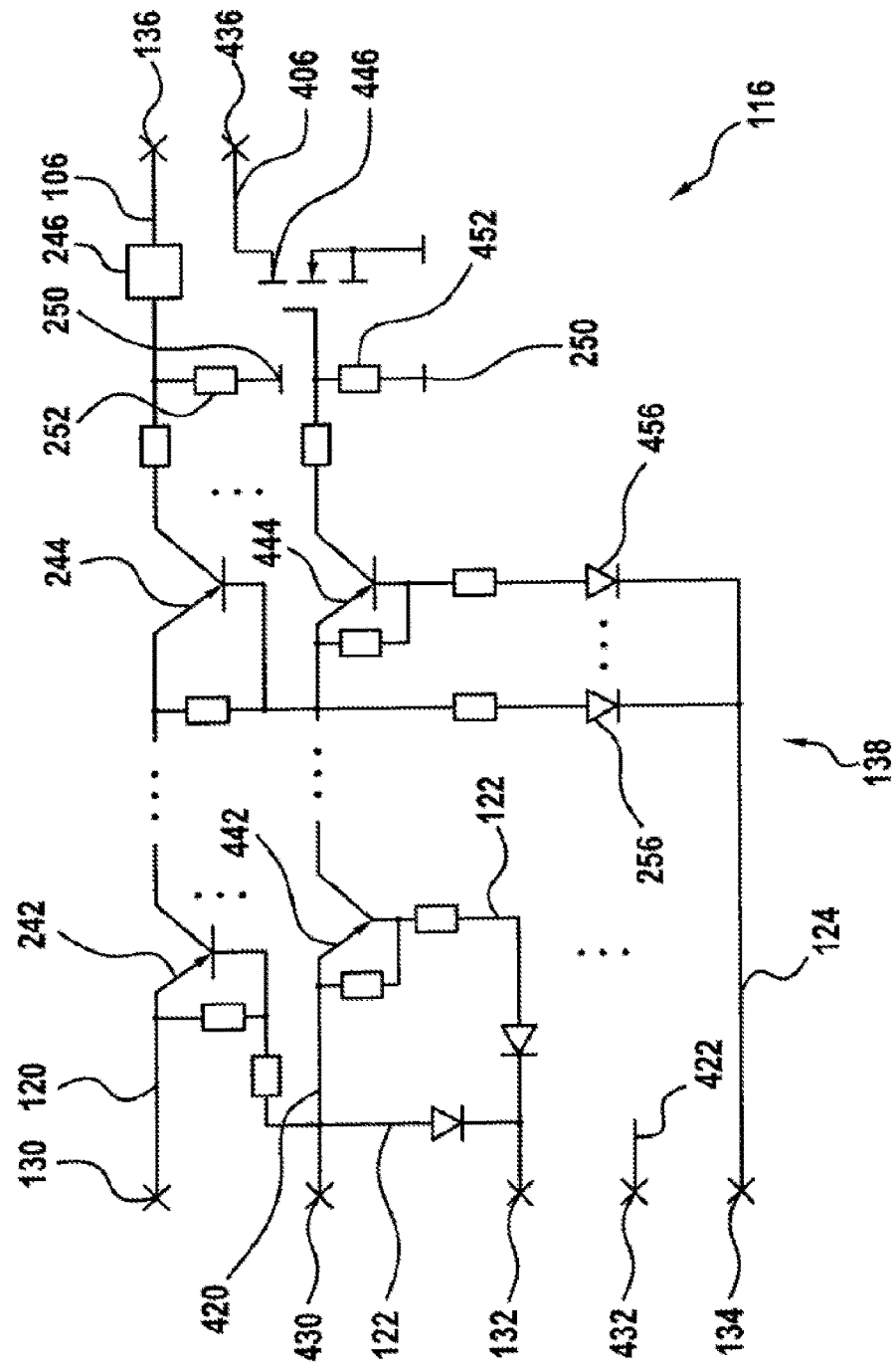
FIG. 4 shows a circuit diagram of a device for controlling an output stage for an actuator in accordance with one exemplary embodiment of the present invention.

Likewise, as indicated below with reference to FIG. 4, the enable terminals can act on as many actuators as desired, as is shown in FIG. 4 by a parallel connection of the transistors 242, 442 and 244, 444.

Referring to FIG. 2, in order to control a plurality of actuators, it is possible to provide for example a number of series connections of transistors 242, 244 corresponding to the plurality of actuators, wherein the number of transistors 242, 244 arranged in a series connection can in turn be extended in any desired manner.

In accordance with an alternative exemplary embodiment, the transistor 242 is omitted, such that the circuit comprises only the transistor 244 comprising the input-side terminals 130, 134 and optionally 258 and the output-side terminal 136.

One exemplary embodiment of the present invention is described below in detail in the form of a circuit extract with reference to FIG. 2.

The application computer, as is shown by way of example in FIG. 1, activates a terminal, here for example the negative terminal of the actuator, such as is shown by way of example in FIG. 1, and comprises at least two solenoid valves (MV12_LS) in accordance with this exemplary embodiment, via the signal 106 ACT_MV12_LS=log.1 and the third transistor 246 (T7009).

The monitoring computer, as is shown by way of example in FIG. 1, can suppress this activation by setting the signal 132 ACT_EN_MV12_LS_B to log.1.

A Vcc voltage monitoring circuit, as is shown by way of example in FIG. 1, can likewise suppress this activation by setting the signal 134 VCC_0V to log.1.

It is only for one of eight possible combinations, namely signal 130 ACT_MV12_LS=log.1, signal 132 ACT_EN_MV12_LS_B at log.0 and signal 134 VCC_0V=log.0, that the negative terminal of the solenoid valves (MV12_LS) is activated by the signal 106 being provided to a terminal of the actuator.

If the signal 132 to the monitoring computer or the signal 134 to the Vcc voltage monitoring circuit is interrupted or the port of the computer and thus the signal 130 are at high impedance (inactive), MV12_LS is likewise deactivated.

By virtue of the fact that the control signals 130, 132, 134 for activating MV12_LS are in opposite senses, even a common-mode error (both signals log1 or both log0) does not lead to the activation.

Any interruption of a component 242, 244, 246, 254, 256 (diodes 245, 256 (D7005), second transistor 244 (T7005), first transistor 242 (T7006) and resistor (R7004) between the transistors 244, 246) from the linking circuit 138 leads to the deactivation of MV12_LS and thus to the safe state by virtue of the signal 106 not being provided or being provided with a state not suitable for the activation of the actuator.

Advantageously, the elements of the linking circuit 138 for the monitoring circuits are arranged such that any individual fault leads to the deactivation of the switched actuator terminal via the output terminal 106 and thus to the safe state of the system.

The chosen arrangement in this case does not require any additional components in comparison with alternative embodiments and thus does not lead to higher costs or a higher space requirement.

Figure 3:
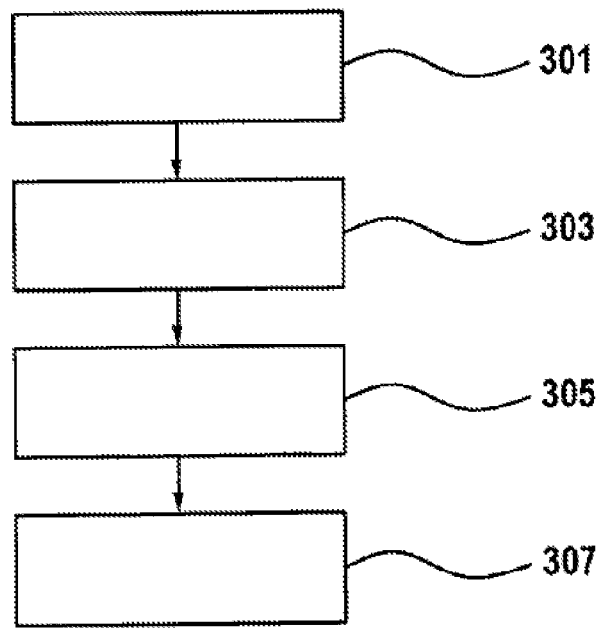
FIG. 3 shows a flow diagram of a method for controlling an output stage for an actuator in accordance with one exemplary embodiment of the present invention.

FIG. 3 shows a flow diagram of a method for controlling an output stage in accordance with one exemplary embodiment of the present invention. The steps of the method can be implemented in association with the units described with reference to FIG. 2.

In a step 301, an enable signal is received via an interface to an application unit, such as is shown in FIG. 1, for example. The enable signal can assume an enable state for enabling a control of the output stage and a disable state for disabling the control of the output stage. In a step 303, a first suppression signal is received via an interface to a monitoring unit, such as is shown in FIG. 1, for example. The first suppression signal can assume a first authorization state for authorizing the control of the output stage and a first suppression state for suppressing the control of the output stage. In a step 305, a second suppression signal is received via an interface to a voltage monitoring unit, such as is shown in FIG. 1, for example. The second suppression signal can assume a second authorization state for authorizing the control of the output stage and a second suppression state for suppressing the control of the output stage.

Steps 301, 303, 305 can be performed repeatedly in a different order, in particular also continuously and simultaneously.

In a step 307, a control signal for controlling the output stage is provided to an output terminal serving as an interface to the output stage. The control signal is provided if the enable signal has the enable state, the first suppression signal has the first authorization state and the second suppression signal has the second authorization state.

FIG. 4 shows a circuit diagram of a device 116 for controlling a plurality of output stages in accordance with one exemplary embodiment of the present invention. The device 116 constitutes an extension of the device described with reference to FIG. 2. The elements of the device 116 that have already been described with reference to FIG. 2 will not be described again below.

The device 116 comprises at least one further enable terminal 430 for receiving a further enable signal 420. The further enable signal 420 can assume a state log.1, which can be referred to as logic one, as an enable state and a state log.0, which can be referred to as logic zero, as a disable state.

Besides the suppression terminals 132, 134, the device 116 optionally comprises one or a plurality of additional suppression terminals, as indicated by the at least one further suppression terminal 432 for receiving a further suppression signal 422. The further suppression signal 422 can assume a state log.0 as an authorization state and a state log.1 as a suppression state.

The device 116 comprises at least one further output terminal 436 as an interface to a further output stage. Via the further output terminal 436, the device 116 is configured to output a further control signal 406 for controlling the further output stage.

The linking unit 138 is realized as a transistor circuit. Switches for connecting or interrupting lines between the input terminals 130, 132, 134 and the output terminal 136 are thus realized by transistors 242, 244, 246.

The linking unit 138 comprises a further first transistor 442, a further second transistor 444 and a further third transistor 446. The enable terminal 130 is connected to an enable terminal of the further first transistor 442. A second terminal of the further first transistor 442 is connected to a first terminal of the further second transistor 444. A second terminal of the further second transistor 444 is connected to a control terminal of the further third transistor 446. A first terminal of the further third transistor 446 is connected to a supply voltage terminal, here the ground terminal 250 of the linking unit 138. A second terminal of the further third transistor 446 is connected to the further output terminal 436. A control terminal of the first transistor 442 is connected to the first suppression terminal 132. A control terminal of the second transistor 444 is connected to the second suppression terminal 134.

In accordance with an alternative exemplary embodiment, the further output stage comprises the further third transistor 446.

In accordance with the exemplary embodiment shown in FIG. 4, the transistors 442, 444 are embodied by way of example as bipolar transistors, and the transistor 446 as a field effect transistor. It is also possible to use other suitable transistors with corresponding transistor interconnections.

In accordance with one exemplary embodiment, the control terminal of the further third transistor 446 is connected to the ground terminal 250 via a pull-down resistor 452. The second terminal of the further second transistor 244 is connected to the control terminal of the further third transistor 446 via a resistor.

In accordance with one exemplary embodiment, the control terminal of the further second transistor 444 is connected to the first terminal of the further second transistor 444 via a resistor and is connected to the second suppression terminal 134 via a resistor and also a diode 456.

In accordance with one exemplary embodiment, the control terminal of the further first transistor 442 is connected to the first terminal of the further first transistor 442 via a resistor and is connected to the first suppression terminal 132 via a resistor and also a diode 460. Correspondingly, the control terminal of the first transistor 242 in accordance with this exemplary embodiment is connected to the first suppression terminal 132 via a resistor and also a diode 462.

Besides the suppression terminals 132, 134, 432 shown, which can be used for receiving enables, the device 116 can comprise one or a plurality of further suppression terminals. Per further suppression terminal, the device 116 comprises per transistor branch a further transistor interconnected in a manner corresponding to the transistors 242, 244, 442, 444 shown.

Besides the enable terminals 130, 430 shown, which can also be referred to as control terminals, the device 116 can comprise one or a plurality of further enable terminals. Per further enable terminal, the device 116 comprises a further transistor branch comprising, per suppression terminal 132, 134, 432 of the device 116, one transistor plus one output-side transistor.

LIST OF REFERENCE SIGNS

100 Vehicle
102 Output stage
104 Actuator
106 Control signal
110 Application unit
112 Monitoring unit
114 Voltage monitoring unit
116 Device
120 Enable signal
122 First suppression signal
124 Second suppression signal
130 Enable terminal
132 First suppression terminal
134 Second suppression terminal
136 Output terminal
138 Linking unit
242 First transistor
244 Second transistor
246 Third transistor
250 Ground terminal
252 Resistor
254 First diode
256 Second diode
258 Safety circuit terminal
260 Signal
301 Step of receiving
303 Step of receiving
305 Step of receiving
307 Step of providing
420 Further enable signal
430 Further enable terminal
436 Further output terminal
442 Further first transistor
444 Further second transistor
446 Further third transistor
452 Further resistor
456 Diode
460 Diode
462 Diode

The invention claimed is:

1. A device for controlling an output stage for an actuator, in particular a solenoid valve, for a vehicle, comprising:
    an enable terminal to receive an enable signal via an interface to an application unit, wherein the enable signal assumes an enable state for enabling a control of the output stage and a disable state for disabling the control of the output stage;
    a first suppression terminal to receive a first suppression signal via an interface to a monitoring unit, wherein the first suppression signal assumes a first authorization state for authorizing the control of the output stage and a first suppression state for suppressing the control of the output stage;
    a second suppression terminal to receive a second suppression signal via an interface to a second monitoring unit, wherein the second suppression signal assumes a second authorization state for authorizing the control of the output stage and a second suppression state for suppressing the control of the output stage;
    an output terminal configured as an interface to the output stage; and
    a linking unit to provide a control signal for controlling the output stage to the output terminal if the enable signal has the enable state, the first suppression signal has the first authorization state and the second suppression signal has the second authorization state.

2. The device of claim 1, wherein the linking unit is configured to not provide the control signal if the enable signal has the disable state and/or the first suppression signal has the first suppression state and/or the second suppression signal has the second suppression state.

3. The device of claim 1, wherein the enable state of the enable signal represents a first logic state, the disable state of the enable signal represents a second logic state, the authorization states of the suppression signals represent the second logic state and the suppression states of the suppression signals represent the first logic state.

4. The device of claim 1, wherein the linking unit includes a first switch, a second switch and a third switch, wherein the first switch and the second switch are connected in series between the enable terminal and a control terminal of the third switch, the third switch is connected between a supply voltage terminal for providing a supply voltage for operating the output stage and the output terminal, a control terminal of the first switch is connected to the first suppression terminal, and a control terminal of the second switch is connected to the second suppression terminal.

5. The device of claim 4, wherein the first switch and the second switch include bipolar transistors and the third switch includes a field effect transistor or a bipolar transistor.

6. The device of claim 4, wherein the linking unit includes a resistor connected between the control terminal of the third switch and the supply voltage terminal.

7. The device of claim 4, wherein the linking unit includes a first diode and a second diode, wherein a safety circuit terminal of the device is connected to the second suppression terminal via the first diode and the second suppression terminal is connected to the control terminal of the second switch via the second diode.

8. The device of claim 1, further comprising:
a safety circuit terminal for receiving a signal which can assume a blocking state for blocking the control of the output stage, wherein the linking unit is configured not to provide the control signal if the signal has the blocking state.

9. The device of claim 1, further comprising:
at least one further enable terminal to receive a further enable signal via a further interface to the application unit or to a further application unit, wherein the further enable signal assumes an enable state for enabling a control of a further output stage and a disable state for disabling the control of the further output stage;
a further output terminal configured as an interface to the further output stage, wherein the linking unit is configured to provide a further control signal for controlling the further output stage to the further output terminal if the further enable signal has the enable state, the first suppression signal has the first authorization state and the second suppression signal has the second authorization state.

10. The device of claim 9, wherein the linking unit includes a further first switch, a further second switch and a further third switch, wherein the further first switch and the second switch are connected in series between the further enable terminal and a control terminal of the further third switch, the further third switch being connected between the supply voltage terminal for providing a supply voltage for operating the further output stage and the further output terminal, a control terminal of the further first switch being connected to the first suppression terminal and a control terminal of the further second switch is connected to the second suppression terminal.

11. The device of claim 1, further comprising:
at least one further suppression terminal to receive a further suppression signal via an interface to a further monitoring unit, wherein the further suppression signal assumes a further authorization state for authorizing the control of the output stage and a further suppression state for suppressing the control of the output stage, wherein the linking unit is configured to provide the control signal for controlling the output stage to the output terminal if the further suppression signal has the further authorization state.

12. A device for controlling an output stage for an actuator or a solenoid valve for a vehicle, comprising:
an enable terminal to receive an enable signal via an interface to an application unit, wherein the enable signal assumes an enable state for enabling a control of the output stage and a disable state for disabling the control of the output stage;
suppression terminals to receive suppression signals via interfaces to monitoring units, wherein the suppression signals assume authorization states for authorizing the control of the output stage and suppression states for suppressing the control of the output stage;
an output terminal configured as an interface to the output stage; and
a linking unit configured to provide a control signal for controlling the output stage to the output terminal if the enable signal has the enable state, and the suppression signals have the authorization states.

13. A method for controlling an output stage for an actuator or a solenoid valve for a vehicle, the method comprising:
receiving an enable signal via an interface to an application unit, wherein the enable signal assumes an enable state for enabling a control of the output stage and a disable state for disabling the control of the output stage;
receiving a first suppression signal via an interface to a monitoring unit, wherein the first suppression signal assumes a first authorization state for authorizing the control of the output stage and a first suppression state for suppressing the control of the output stage;
receiving a second suppression signal via an interface to a voltage monitoring unit, wherein the second suppression signal assumes a second authorization state for authorizing the control of the output stage and a second suppression state for suppressing the control of the output stage; and
providing a control signal for controlling the output stage at an output terminal serving as an interface to the output stage if the enable signal has the enable state, the first suppression signal has the first authorization state and the second suppression signal has the second authorization state.

14. An actuator circuit for a vehicle, comprising:
a device for controlling an output stage for an actuator or a solenoid valve for a vehicle, including:
an enable terminal to receive an enable signal via an interface to an application unit, wherein the enable signal assumes an enable state for enabling a control of the output stage and a disable state for disabling the control of the output stage;
a first suppression terminal to receive a first suppression signal via an interface to a monitoring unit, wherein the first suppression signal assumes a first authorization state for authorizing the control of the output stage and a first suppression state for suppressing the control of the output stage;
a second suppression terminal to receive a second suppression signal via an interface to a second monitoring unit, wherein the second suppression signal assumes a second authorization state for authorizing the control of the output stage and a second suppression state for suppressing the control of the output stage;
an output terminal configured as an interface to the output stage; and a linking unit to provide a control signal for controlling the output stage to the output terminal if the enable signal has the enable state, the first suppression signal has the first authorization state and the second suppression signal has the second authorization state;

an application unit for providing the enable signal to the enable terminal of the device;

a monitoring unit for providing the first suppression signal to the first suppression terminal of the device;

a voltage monitoring unit for providing the second suppression signal to the second suppression terminal of the device; and the output stage, wherein a terminal of the output stage is connected to the output terminal of the device.

\* \* \* \* \*